US007485370B2

(12) United States Patent
Schwarzbach et al.

(10) Patent No.: US 7,485,370 B2
(45) Date of Patent: Feb. 3, 2009

(54) FIRE RETARDANT MATERIAL AND TEXTILE ARTICLE COMPRISING AMMONIUM POLYPHOSPHATE PARTICLES AND MELAMINE-BASED PARTICLES

(75) Inventors: Tilo Schwarzbach, Sheffield (GB); Jo McKnight, Nottinghamshire (GB)

(73) Assignee: Dartex Coatings Limited (GB)

( * ) Notice: Subject to any disclaimer, the term of this patent is extended or adjusted under 35 U.S.C. 154(b) by 29 days.

(21) Appl. No.: 11/813,547

(22) PCT Filed: Jan. 5, 2006

(86) PCT No.: PCT/GB2006/000046

§ 371 (c)(1),
(2), (4) Date: Jul. 9, 2007

(87) PCT Pub. No.: WO2006/075136

PCT Pub. Date: Jul. 20, 2006

(65) Prior Publication Data
US 2008/0166559 A1    Jul. 10, 2008

(30) Foreign Application Priority Data
Jan. 13, 2005 (GB) ................... 0500629.1

(51) Int. Cl.
*B32B 5/16* (2006.01)
*B05D 1/26* (2006.01)
*C09D 5/18* (2006.01)
(52) U.S. Cl. .................. 428/403; 106/16; 106/18.15; 106/18.16; 106/18.17; 106/499; 106/503; 427/189; 427/195; 427/201; 428/407

(58) Field of Classification Search .................. 428/403, 428/407; 106/16, 18.15, 18.16, 18.17, 499, 106/503; 427/189, 195, 201
See application file for complete search history.

(56) References Cited

U.S. PATENT DOCUMENTS

| 4,639,331 | A  |   | 1/1987  | Elsner et al.            |
|-----------|----|---|---------|--------------------------|
| 5,599,626 | A  | * | 2/1997  | Fukumura et al. ... 428/403 |
| 5,700,575 | A  | * | 12/1997 | Iwata et al. ....... 428/403 |
| 5,945,467 | A  | * | 8/1999  | Iwata et al. ....... 523/205 |
| 6,291,068 | B1 | * | 9/2001  | Wang et al. ........ 428/403 |
| 6,444,315 | B1 | * | 9/2002  | Barfurth et al. ..... 428/403 |

FOREIGN PATENT DOCUMENTS

| EP |    0131097    |   | 1/1985  |
|----|---------------|---|---------|
| EP |    0659819    |   | 8/1999  |
| EP |    0955349    |   | 11/1999 |
| EP |    0686661    |   | 7/2001  |
| GB |    1390939    |   | 4/1975  |
| JP | 40-8049196 A  | * | 8/1994  |
| JP |    10168304   |   | 6/1998  |

OTHER PUBLICATIONS

International Search Report for PCT/GB06/00046, (Oct. 2006).
British Search Report for GB0500629.1, (2007).

* cited by examiner

*Primary Examiner*—H. T Le
(74) *Attorney, Agent, or Firm*—Caesar, Rivise, Bernstein, Cohen & Pokotilow, Ltd.

(57) ABSTRACT

A fire retardant material comprising both ammonium polyphosphate particles microencapsulated within a melamine or melamine-based resin and melamine-based particles retained in a base material. The material may be applied to a textile article or incorporated into an article during formation thereof.

19 Claims, 1 Drawing Sheet

FIRE RETARDANT MATERIAL AND TEXTILE ARTICLE COMPRISING AMMONIUM POLYPHOSPHATE PARTICLES AND MELAMINE-BASED PARTICLES

BACKGROUND OF THE INVENTION

This invention relates to fire retardance and, in particular, although not exclusively, to fire retardant materials for application or incorporation in articles, for example for application to textiles and to textiles with such materials applied thereto.

Fire retardant materials for the application to textiles are well known. However, many of these materials are halogen-based (or at least contain halogens) and many can produce dioxin or dioxin-like compounds when exposed, in use, to heat.

Clearly, due to growing environmental concerns about the release of halogenated organic compounds into the environment, and more specifically to the potential for bio-accumulation of such materials and/or their degradation products, it is desirable to reduce the use of halogens in both material processing and in products.

Ammonium polyphosphate (APP) and APP-based systems are known halogen-free flame retardants mainly used in polyolefins (PE, PP), thermoset resins such as epoxy resins, polyurethane, unsaturated polyester phenolic resins and others. APP is a non-toxic, environmentally friendly material and it does not generate additional quantities of smoke due to the mechanism of "intumescence".

Melamine-based flame retardants are becoming more popular as flame retardant materials. In this family of non-halogenated flame retardants, three chemical groups can be distinguished; pure melamine, melamine derivatives, i.e. salts with organic or inorganic acids such as boric acid, cyanuric acid, phosphoric acid or pyro/poly-phosphoric acid, and melamine homologues.

Melamine-based flame retardants show excellent flame retardant properties and versatility in use because of their ability to employ various modes of flame retardant action.

US 2002/0013391 A1 discloses a flame retardant resin coating comprising a flame retardant additive added to a base resin to provide a flame retardant base resin which is covered by a transparent top coat. The resins are for application to rigid substrates such as exterior cladding of buildings, wall facings, gravel stops, balcony facings, parapet slabs, wet rooms and laboratories. The additive may comprise melamine polyphosphates, melamine pyrophosphates, ammonium polyphosphates and mixtures thereof. In one embodiment, a suitable additive comprises an ammonium polyphosphate microencapsulated in a resin having a water solubility of from about 0.06 to about 0.19 g/100 g water.

EP 0131097 and U.S. Pat. No. 4,639,331 disclose the formation of microencapsulated ammonium polyphosphate to render the ammonium polyphosphate stable to hydrolysis. Microencapsulation is said to beneficially influence the use of such pre-treated ammonium polyphosphates as flame retardant agents in polyurethane foams.

EP 0966349 A1 discloses a flame retardant/heat resistant agent and adhesive, which includes one or more oxides of phosphorus, antimony, silicon and melamine cyanurate as the flame retardant agents and which can increase both the flame retardance/heat resistance of the cloth material and the binding strength of the cloth to a variety of thermoplastic polymers.

EP 0659819 B1 discloses a flame-retardant thermosetting resin composition containing a non-halogen type flame-retardant. In particular, it relates to a flame-retardant thermosetting resin composition having high water resistance and excellent mechanical properties which contains, as a non-halogen type flame-retardant, (1) melamine-coated ammonium polyphosphate particles and/or (2) water-insoluble ammonium polyphosphate particles.

It is an object of this invention to provide a fire-retardant material which is suitable for use in a plurality of embodiments, for example for application to textiles, and to an article, for example a coated or laminated textile material, in which the fire retardency is enhanced by the use in formation or application of such fire-retardant materials. It is a further, but not exclusive, object of the invention to provide a fire-retardant material which exhibits at least comparable although preferably improved performance over the prior art and one which, preferably, is at least as, if not more, environmentally friendly than prior art fire retardant materials.

SUMMARY OF THE INVENTION

Accordingly, a first aspect of the invention provides a fire retardant material comprising both ammonium polyphosphate particles microencapsulated within a melamine or melamine-based resin and melamine-based particles retained in a base material wherein the weight to weight ratio of ammonium polyphosphate particles microencapsulated within a melamine or melamine-based resin and melamine-based particles is from 3:1 to 1:3.

The melamine-based particles may be melamine cyanurate, melamine polyphosphate, melamine pyrophosphate, melamine phosphate and so on.

The base material may be polymeric, for example a polymeric resin, a wax, a binder and so on.

The polymer base resin may be a polyurethane, acrylic, polyvinyl chloride (PVC), polyester or epoxy, with polyurethane-based resins being particularly preferred.

Blends of polyurethanes may be utilised, for example polyurethanes based on polyether, polyester, polycarbonate, poly(capralactone) and so on.

The fire retardant material may be used as a coating for textiles, for example for use as a coating for flexible foams used in furniture manufacture, or as carpet backing and underlay. It may be included or incorporated in foams, for example a rigid or flexible foam, during the formation thereof or in plastic moulded items or extruded polymers.

A second aspect of the invention provides a fire-retardant textile material for application to textiles comprising both ammonium polyphosphate particles microencapsulated within a melamine resin or melamine-based resin and melamine cyanurate particles retained in a base resin.

A third aspect of the invention provides a fire-retardant textile article comprising a textile substrate coated with a fire-retardant material, the fire-retardant material comprising both ammonium polyphosphate particles microencapsulated within a melamine resin or melamine-based resin and melamine cyanurate particles retained in a polyurethane base resin.

Preferably the fire retardant species or additives are dispersed in a liquid polyurethane resin solution prior to coating the textile article with the solution.

The ammonium polyphosphate particles may be melamine ammonium polyphosphate particles or melamine formaldehyde ammonium polyphosphate particles.

The polymer base resin may comprise further additives, such as colorants, UV stabilizers, antimicrobials, antifungals and other state-of-the-art additives for the use in polymer resins, for example in polyurethane resins.

The textile article may be provided with a plurality of layers of fire retardant material.

The, one, or each layer may be applied with a basis weight of from about 5 to about 55 gm$^{-2}$.

A further aspect of the invention provides a method of coating a textile article to provide a fire-retardant textile article, the method comprising dispersing fire retardant materials in a base material, the fire retardant material comprising ammonium polyphosphate particles microencapsulated within a melamine resin or melamine-based resin and melamine-based particles, and coating the so-formed dispersion onto a textile article.

The weight to weight (w/w) ratio of ammonium polyphosphate particles microencapsulated within a melamine or melamine-based resin and melamine-based particles is preferably from 4:1 to 1:4, most preferably from 3:1 to 1:3 and, in one embodiment, may be 1:1.

The ratio of fire retardant content (i.e. the sum of ammonium polyphosphate particles microencapsulated within a melamine or melamine-based resin and melamine-based particles) is preferably less than 60 w/w % of the base resin, preferably 5 to 50 w/w %. Each fire retardant component is preferably present at about 5-25, preferably 5 to 15 w/w % of the resin when used as a coating for textile articles.

The base resin may be used in solution with an appropriate solvent or as a fluid to aid mixing when the fire retardant species are to be incorporated into a solid article (e.g. the fire retardants may be mixed into a liquid resin for the purposes of extrusion). Where the fire retardant is to be used in coating applications, the base resin will typically be provided as a solution of from 10 to 50% solids.

Preferably the resin is a polyurethane.

The method may comprise coating an article with a plurality of layers of a dispersion.

Suitable ammonium polyphosphate particles may be supplied by Budenheim Iberica Commercial S.A of Zaragoza, Spain under the trade names FR Cros C30 and FR Cros C60. A suitable melamine cyanurate may also be supplied by Budenheim Iberica Commercial S.A. under the trade name Budit 315, or by Ciba Geigy Melapur. Other suitable species are available.

BRIEF DESCRIPTION OF SEVERAL VIEWS OF THE DRAWINGS

In order that the invention may be more fully understood it will now be described with reference to the accompanying Examples and to the accompanying drawing which shows the application of three fire retardant materials 1, 2, 3 to a carrier paper 4 and subsequent application to a textile 5 and removal of the carrier paper 4 to provide a coated textile article 10.

DETAILED DESCRIPTION OF THE PREFERRED EMBODIMENTS

Figure 1:
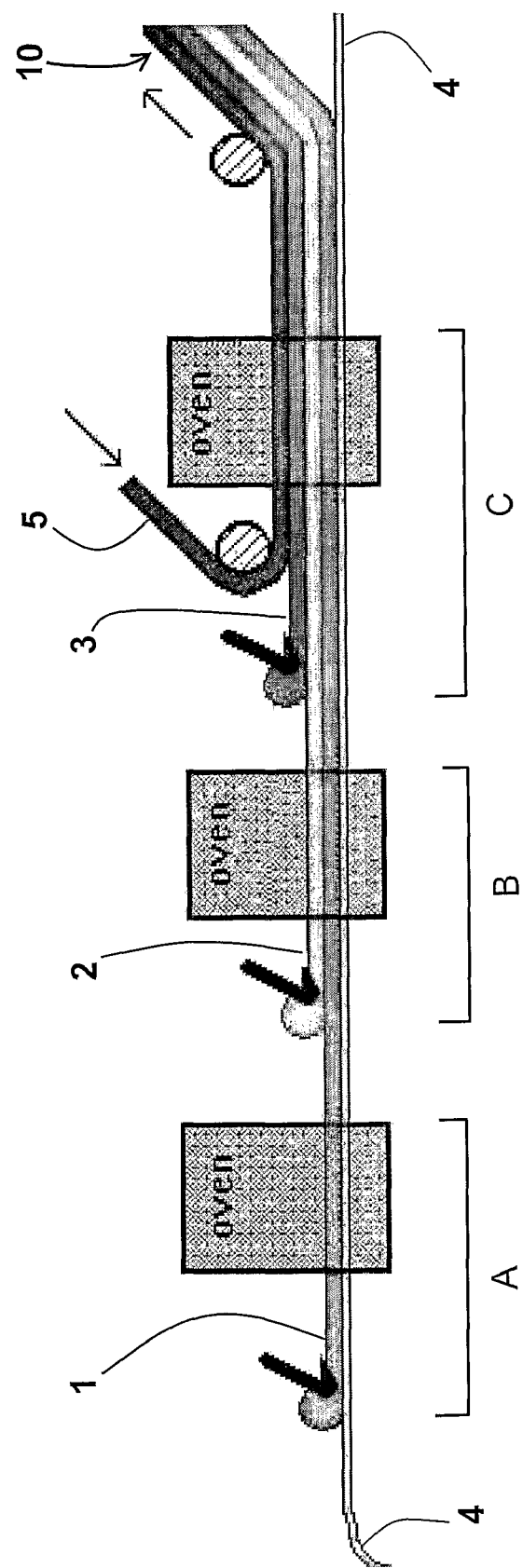

It will be appreciated that an oven is provided to remove the solvent from each layer (and thereby dry it) prior to the application of a subsequent layer. This is not a requirement if the polymer is applied as a hot melt.

EXAMPLE 1

The following fire retardant coating mixture was made.

| Species | Role | Parts |
| --- | --- | --- |
| Polyurethane resin (30% solids) | Base Resin | 100 |
| | Solvent | 10 |
| | Additives | 3.6545 |
| Surface-reacted melamine formaldehyde ammonium polyphosphate | Fire retardant | 3.75 |
| Melamine Cyanurate | Fire retardant | 3.75 |

The fire retardants and other species were dispersed in the polyurethane base resin for application to the carrier paper as species 1 (as a top coat) at the first stage of the process, indicated as A in the drawing to a thickness of 38 gm$^{-2}$.

The following coating mixture was made.

| Species | Role | Parts |
| --- | --- | --- |
| Polyurethane resin (30% solids) | Base Resin | 100 |
| | Solvent | 30 |
| | Additives | 0.375 |
| Surface-reacted melamine formaldehyde ammonium polyphosphate | Fire retardant | 3.75 |
| Melamine Cyanurate | Fire retardant | 3.75 |

The fire retardants and other species were dispersed in the polyurethane base resin for application to the top coat (species 1) as an intercoat (species 2) at the second stage of the process, indicated as B in the drawing, to a thickness of 18 gm$^{-2}$.

The following fire retardant coating mixture was made.

| Species | Role | Parts |
| --- | --- | --- |
| Polyurethane resin (35% solids) | Base Resin | 100 |
| | Solvent | 4 |
| | Additives | 1.675 |
| Surface-reacted melamine formaldehyde ammonium polyphosphate | Fire retardant | 4.375 |
| Melamine Cyanurate | Fire retardant | 4.375 |

The fire retardants and other species were dispersed in the polyurethane base resin for application to the intercoat (species 2) as an adhesive or tie coat (as species 3) at the third stage of the process, indicated as C in the drawing, to a thickness of 38gm$^{-2}$.

The textile material 5 was a proprietary fire retardant treated weft knit double jersey textile substrate supplied by A. Rowe Ltd, designated AR2856 and having a basis weight of 300 gm$^{-2}$.

The coated textile article 10 was placed on a foam support and subjected to testing under British Standard 6807 (top test) using ignition source 7. The coated textile 10 passed this test.

Previously, it has only been possible to pass this standard using a carbon-coated foam or using an additional FR barrier layer. Clearly, the fire-retardant textile of the invention provides a significant improvement over the prior art in terms of performance and ensures that the article is cheaper to manufacture because carbon-coated foams or further FR barrier layers are not required.

EXAMPLE 2

A further textile article 10 was fabricated, as above, using the following top layer 1.

| Species | Role | Parts |
|---|---|---|
| Polyurethane resin | Base Resin | 100 |
| | Solvent | 10 |
| | Additives | 3.6545 |
| Surface-reacted melamine formaldehyde ammonium polyphosphate | Fire retardant | 3.75 |
| Melamine Cyanurate | Fire retardant | 3.75 |

The fire retardants and other species were dispersed in the polyurethane base resin for application to the carrier paper as species 1 (as a top coat) at the first stage of the process, indicated as A in the drawing, to a thickness of 38 $gm^{-2}$.

The intercoat and tie coat 2, 3 were as in Example 1.

The textile material 5 was a Proban treated single jersey cotton fabric supplied by Parklane Textiles Ltd designated PL140S and having a basis weight of 140 $gm^{-2}$.

The coated textile article 10 was placed on a foam support and subjected to testing under British Standard 5852 using ignition source 5. The coated textile 10 passed the test.

EXAMPLE 3

The following fire retardant coating mixture was made.

| Species | Role | Parts |
|---|---|---|
| Polyurethane resin (30% solids) | Base Resin | 100 |
| | Solvent | 20 |
| | Additives | 4.1342 |
| Surface-reacted melamine formaldehyde ammonium polyphosphate | Fire retardant | 3.75 |
| Melamine Cyanurate | Fire retardant | 3.75 |

The fire retardants and other species were dispersed in the polyurethane base resin for application to the carrier paper as species 1 (as a top coat) at the first stage of the process, indicated as A in the drawing to a thickness of 38 $gm^{-2}$.

The following coating mixture was made.

| Species | Role | Parts |
|---|---|---|
| Polyurethane resin (30% solids) | Base Resin | 100 |
| | Solvent | 30 |
| | Additives | 0.375 |
| Surface-reacted melamine formaldehyde ammonium polyphosphate | Fire retardant | 3.75 |
| Melamine Cyanurate | Fire retardant | 3.75 |

The fire retardants and other species were dispersed in the polyurethane base resin for application to the species 1 as species 2 (as an intercoat) at the second stage of the process, indicated as B in the drawing, to a thickness of 18 $gm^{-2}$.

The following fire retardant coating mixture was made.

| Species | Role | Parts |
|---|---|---|
| Polyurethane resin (38% solids) | Base Resin | 100 |
| | Solvent | 7.09 |
| | Additives | 1.8186 |
| Surface-reacted melamine formaldehyde ammonium polyphosphate | Fire retardant | 4.75 |
| Melamine Cyanurate | Fire retardant | 4.75 |

The fire retardants and other species were dispersed in the polyurethane base resin for application to species 2 as species 3 (as an adhesive or tie coat) at the third stage of the process, indicated as C in the drawing, to a thickness of 38 $gm^{-2}$.

The textile material 5 was a polyester weft knit double jersey textile substrate supplied by Park Lane Textiles Ltd., designated PL125S and having a basis weight of 145 $gm^{-2}$.

The coated textile article 10 was placed on a mineral wool support and subjected to testing under British Standard 7175 using ignition source 5. The coated textile 10 passed this test to show that this fabric of the invention performs at least as well as standard coated fabric containing conventional flame retardant species.

EXAMPLE 4

The following fire retardant coating mixture was made.

| Species | Role | Parts |
|---|---|---|
| Polyurethane resin (30% solids) | Base Resin | 100 |
| | Solvent | 20 |
| | Additives | 4.1342 |
| Surface-reacted melamine ammonium polyphosphate | Fire retardant | 5.625 |
| Melamine Cyanurate | Fire retardant | 1.875 |

The fire retardants and other species were dispersed in the polyurethane base resin for application to the carrier paper as species 1 (as a top coat) at the first stage of the process, indicated as A in the drawing to a thickness of 38 $gm^{-2}$.

The following coating mixture was made.

| Species | Role | Parts |
|---|---|---|
| Polyurethane resin (30% solids) | Base Resin | 100 |
| | Solvent | 30 |
| | Additives | 0.375 |
| Surface-reacted melamine ammonium polyphosphate | Fire retardant | 5.625 |
| Melamine Cyanurate | Fire retardant | 1.875 |

The fire retardants and other species were dispersed in the polyurethane base resin for application to the species 1 as species 2 (as an intercoat) at the second stage of the process, indicated as B in the drawing, to a thickness of 18 $gm^{-2}$.

The following fire retardant coating mixture was made.

| Species | Role | Parts |
|---|---|---|
| Polyurethane resin (38% solids) | Base Resin | 100 |
| | Solvent | 7.09 |
| | Additives | 1.8186 |

-continued

| Species | Role | Parts |
| --- | --- | --- |
| Surface-reacted melamine ammonium polyphosphate | Fire retardant | 7.125 |
| Melamine Cyanurate | Fire retardant | 2.375 |

The fire retardants and other species were dispersed in the polyurethane base resin for application to species 2 as species 3 (as an adhesive or tie coat) at the third stage of the process, indicated as C in the drawing, to a thickness of 38 gm$^{-2}$.

The textile material 5 was a polyester weft knit double jersey textile substrate supplied by A. Rowe Ltd, designated AR2856 and having a basis weight of 300 gm$^{-2}$.

The coated textile article 10 was placed on a foam support and subjected to testing under British Standard 6807 using ignition source 7 (top test). The coated textile 10 passed this test.

EXAMPLE 5

The following fire retardant coating mixture was made.

| Species | Role | Parts |
| --- | --- | --- |
| Polyurethane resin (30% solids) | Base Resin | 100 |
|  | Solvent | 20 |
|  | Additives | 4.1342 |
| Surface-reacted melamine ammonium polyphosphate | Fire retardant | 1.875 |
| Melamine Cyanurate | Fire retardant | 5.625 |

The fire retardants and other species were dispersed in the polyurethane base resin for application to the carrier paper as species 1 (as a top coat) at the first stage of the process, indicated as A in the drawing to a thickness of 38 gm$^{-2}$.

The following coating mixture was made.

| Species | Role | Parts |
| --- | --- | --- |
| Polyurethane resin (30% solids) | Base Resin | 100 |
|  | Solvent | 30 |
|  | Additives | 0.375 |
| Surface-reacted melamine ammonium polyphosphate | Fire retardant | 1.875 |
| Melamine Cyanurate | Fire retardant | 5.625 |

The fire retardants and other species were dispersed in the polyurethane base resin for application to the species 1 as species 2 (as an intercoat) at the second stage of the process, indicated as B in the drawing, to a thickness of 18 gm$^{-2}$.

The following fire retardant coating mixture was made.

| Species | Role | Parts |
| --- | --- | --- |
| Polyurethane resin (38% solids) | Base Resin | 100 |
|  | Solvent | 7.09 |
|  | Additives | 1.8186 |
| Surface-reacted melamine ammonium polyphosphate | Fire retardant | 2.375 |
| Melamine Cyanurate | Fire retardant | 7.125 |

The fire retardants and other species were dispersed in the polyurethane base resin for application to species 2 as species 3 (as an adhesive or tie coat) at the third stage of the process, indicated as C in the drawing, to a thickness of 38 gm$^{-2}$.

The textile material 5 was a polyester weft knit double jersey textile substrate supplied by A. Rowe Ltd, designated AR2856 and having a basis weight of 300 gm$^{-2}$.

The coated textile article 10 was placed on a foam support and subjected to testing under British Standard 6807 using ignition source 7 (top test). The coated textile 10 passed this test.

EXAMPLE 6

The following fire retardant coating mixture was made.

| Species | Role | Parts |
| --- | --- | --- |
| Polyurethane resin (30% solids) | Base Resin | 100 |
|  | Solvent | 20 |
|  | Additives | 4.1342 |
| Surface-reacted melamine ammonium polyphosphate | Fire retardant | 6.429 |
| Melamine Cyanurate | Fire retardant | 6.429 |

The fire retardants and other species were dispersed in the polyurethane base resin for application to the carrier paper as species 1 (as a top coat) at the first stage of the process, indicated as A in the drawing to a thickness of 38 gm$^{-2}$.

The following coating mixture was made.

| Species | Role | Parts |
| --- | --- | --- |
| Polyurethane resin (30% solids) | Base Resin | 100 |
|  | Solvent | 30 |
|  | Additives | 0.375 |
| Surface-reacted melamine ammonium polyphosphate | Fire retardant | 6.429 |
| Melamine Cyanurate | Fire retardant | 6.429 |

The fire retardants and other species were dispersed in the polyurethane base resin for application to the species 1 as species 2 (as an intercoat) at the second stage of the process, indicated as B in the drawing, to a thickness of 18 gm$^{-2}$.

The following fire retardant coating mixture was made.

| Species | Role | Parts |
| --- | --- | --- |
| Polyurethane resin (38% solids) | Base Resin | 100 |
|  | Solvent | 7.09 |
|  | Additives | 1.8186 |
| Surface-reacted melamine ammonium polyphosphate | Fire retardant | 8.143 |
| Melamine Cyanurate | Fire retardant | 8.143 |

The fire retardants and other species were dispersed in the polyurethane base resin for application to species 2 as species 3 (as an adhesive or tie coat) at the third stage of the process, indicated as C in the drawing, to a thickness of 38 gm$^{-2}$.

The textile material 5 was a polyester weft knit double jersey textile substrate supplied by A. Rowe Ltd, designated AR2856 and having a basis weight of 300 gm$^{-2}$.

The coated textile article 10 was placed on a foam support and subjected to testing under British Standard 6807 (top test) and British Standard 5852 using ignition source 7. The coated textile 10 passed both tests.

EXAMPLE 7

The following fire retardant coating mixture was made.

| Species | Role | Parts |
|---|---|---|
| Polyurethane resin (30% solids) | Base Resin | 100 |
| | Solvent | 20 |
| | Additives | 4.1342 |
| Surface-reacted melamine ammonium polyphosphate | Fire retardant | 1.667 |
| Melamine Cyanurate | Fire retardant | 1.667 |

The fire retardants and other species were dispersed in the polyurethane base resin for application to the carrier paper as species 1 (as a top coat) at the first stage of the process, indicated as A in the drawing to a thickness of 38 gm$^{-2}$.

The following coating mixture was made.

| Species | Role | Parts |
|---|---|---|
| Polyurethane resin (30% solids) | Base Resin | 100 |
| | Solvent | 30 |
| | Additives | 0.375 |
| Surface-reacted melamine ammonium polyphosphate | Fire retardant | 1.667 |
| Melamine Cyanurate | Fire retardant | 1.667 |

The fire retardants and other species were dispersed in the polyurethane base resin for application to the species 1 as species 2 (as an intercoat) at the second stage of the process, indicated as B in the drawing, to a thickness of 18 gm$^{-2}$.

The following fire retardant coating mixture was made.

| Species | Role | Parts |
|---|---|---|
| Polyurethane resin (38% solids) | Base Resin | 100 |
| | Solvent | 7.09 |
| | Additives | 1.8186 |
| Surface-reacted melamine ammonium polyphosphate | Fire retardant | 2.111 |
| Melamine Cyanurate | Fire retardant | 2.111 |

The fire retardants and other species were dispersed in the polyurethane base resin for application to species 2 as species 3 (as an adhesive or tie coat) at the third stage of the process, indicated as C in the drawing, to a thickness of 38 gm$^{-2}$.

The textile material 5 was a polyester weft knit double jersey textile substrate supplied by A. Rowe Ltd, designated AR2856 and having a basis weight of 300 gm$^{-2}$.

The coated textile article 10 was placed on a foam support and subjected to testing under British Standard 6807 using ignition source 7 (top test). The coated textile 10 passed this test using a combustion-modified foam with a thickness of 150 mm as opposed to the usual thickness of 100 mm.

In one, some or all of the blends made above, the polyurethane may be a blend of polyurethanes derived from different materials.

It will be appreciated that resin systems other than polyurethane may be used. For example, if a vapour impermeable article is required, the fire-retardants may be dispersed in PVC.

Ammonium polyphosphates which are microencapsulated in other melamine-based resin systems may be used. Melamine derivatives, such as melamine polyphosphate or phosphite may be used.

The fire-retardant species dispersed in a resin system may be coated onto non-flexible substrates to provide fire retardance. More or less than three coatings may be applied (for example a single coating or five coatings).

Other coating techniques may be employed such as calendar spreading, transfer coating, laminating, hot melt coating, meyer bar, knife-over-roller, knife-over-air, reverse coat rolling, extrusion and so on.

Other means of solvent removal may be used other than drying in an oven, for example radiation curing may be used.

Whilst we do not wish to be bound by any particular theory, it is postulated that the improved performance of the fire-retardant material is due to a synergy of the mechanisms of fire-retardance. This is shown by the results of vertical burn test in the style of UL 94V applied to coated fabrics with varying degrees of FR protection.

The coated fabrics consisted of top coat, tie coat and a knitted polyester fabric. Both top coat and tie coat contained FR additives, as described in Table 1.

For this test, strips of material (20 cm×5 cm) were cut and held with a pair of tongues to depend vertically. Each strip was ignited for 5 s with a burning match. The ignition source was subsequently removed and the burning and extinction characteristics were observed. Table 1 shows the results.

TABLE 1

Burning and self-extinction of several fabrics containing 10 w/w % of FR

| FR protection level | Burning and extinction behaviour |
|---|---|
| 10% FR CROS 30 | Ignition of fabric after 5 s. Droplets after 17 s. Molten flaming droplet after 28s, coinciding with extinction of the flame. |
| 10% FR CROS 60 | Ignition of fabric after 5 s. Many burning droplets, starting after 15 s. No extinction after 30 s (catastrophic failure). |
| 10% BUDIT 315 | Ignition of fabric after 5 s (difficult due to curling of fabric). Several burning droplets after 12 s. Large molten flaming droplet after 15 s, coinciding with extinction of the flame. |
| Mixture of 5% FR CROS 60 and 5% BUDIT 315 | A) Ignition of fabric after 5 s. Self-extinction after 8 s. No droplets or burning droplets observed. B) Ignition of fabric after 5 s. One small flaming droplet after 9 s, coinciding with extinction of the flame. |

The results displayed in Table 1 clearly indicate that there is a synergistic effect of several FR mechanisms which greatly enhances the efficacy of the FR protection when a mixture of phosphorous- and melamine-based FRs is used.

When used as a coating for textiles, the fire-retardant material will have particular utility in oil-rigs, secure buildings (prisons, secure hospitals) and the like for the manufacture of mattress covers, seat and other furniture coverings, curtains, drapes, clothing and so on.

Other uses to which the fire retardant material of the invention can be put, are shown in Table 2, below:

TABLE 2

Other uses for the FR material of the invention.

| End Use | Markets | % Loading/w/w FR:resin |
|---|---|---|
| Flexible Foams | Furniture manufacture including automotive seating and airline seating | 5-25% |
| | Carpet backing and underlay | |
| Rigid Foams | Wall sheeting insulation | 5-50% |
| | Roofing | |
| | Refrigeration insulation | |
| Plastic moulded items | Automotive components | 5-50% |
| | Airline components | |
| | Toys | |
| | Electrical Equipment casing | |
| | Printed circuit boards | |
| | Electrical cooling systems | |
| | Electrical connectors | |
| Extruded polymers | Wiring and cable sheaths | 5-50% |

Clearly, the fire retardant materials of the invention can be incorporated into a polymer matrix and then the matrix foamed by in situ gas generation, blowing and so on. The fire retardant species of the invention can also be dispersed into a liquid polymer system for the purposes of extrusion, preferably by pre-mixing the two particles into the polymer system and then extruding. Other additives such as flow enhancers may be added, as is known to the skilled addressee.

Without further elaboration of the foregoing will so fully illustrate our invention that others may, by applying current or future knowledge, adapt the same for use under various conditions of service.

The invention claimed is:

1. A fire retardant material for application to textiles comprising (a) ammonium polyphosphate particles microencapsulated within a melamine resin or melamine-based resin and (b) melamine-based particles retained in (c) a base material, wherein the weight to weight ratio of (a) ammonium polyphosphate particles microencapsulated within a melamine or melamine-based resin and (b) melamine-based particles is from 3:1 to 1:3.

2. A material according to claim 1, wherein the ammonium polyphosphate particles are surface reacted melamine ammonium polyphosphate particles.

3. A material according to claim 1, wherein the ammonium polyphosphate particles are surface reacted melamine formaldehyde ammonium polyphosphate particles.

4. A material according to claim 1, wherein the melamine-based particles are one or more of melamine cyanurate, melamine polyphosphate, melamine pyrophosphate, melamine phosphite.

5. A material according to claim 1, wherein the base material comprises one of a wax, a resin or a binder.

6. A material according to claim 5, wherein the base material comprises a polymeric resin, for example polyurethane.

7. A material according to claim 1, wherein the weight to weight ratio of ammonium polyphosphate particles microencapsulated within a melamine or melamine-based resin and melamine-based particles is 1:1.

8. A material according to claim 1, wherein the sum of the weights of ammonium polyphosphate particles microencapsulated within a melamine or melamine-based resin and melamine-based particles is less than 60 w/w % of the base resin.

9. A material according to claim 8, wherein the sum of the weights of ammonium polyphosphate particles microencapsulated within a melamine or melamine-based resin and melamine-based particles is in the range of from 5 to 50 w/w % of the base resin.

10. A material according to claim 1, wherein the base material comprises a polymeric resin and the melamine-based particles consist of melamine cyanurate.

11. A fire retardant textile article coated with a fire-retardant material according to claim 10.

12. A textile article according to claim 11, wherein the ammonium polyphosphate particles are surface reacted melamine ammonium polyphosphate particles.

13. A textile article according to claim 12, wherein the ammonium polyphosphate particles are surface reacted melamine formaldehyde ammonium polyphosphate particles.

14. A textile article according to claim 11, comprising a plurality of layers of fire retardant material according to claim 1.

15. A textile article according to claim 11, wherein the or each layer has a basis weight of from about 5 to about 55 $gm^{-2}$.

16. A textile article according to claim 14, wherein the sum of the weights of ammonium polyphosphate particles microencapsulated within a melamine or melamine-based resin and melamine-based particles is in the range of from 5 to 25 w/w % of the base resin.

17. A method of coating a textile article to provide a fire-retardant textile article, the method comprising dispersing fire retardant material in a base material, the fire retardant material comprising ammonium polyphosphate particles microencapsulated within a melamine or melamine-based resin and melamine cyanurate particles, and coating the so-formed dispersion onto a textile article wherein the weight to weight ratio of ammonium polyphosphate particles microencapsulated within a melamine or melamine-based resin and melamine cyanurate particles is from 3:1 to 1:3.

18. A method according to claim 17, comprising dispersing the fire-retardant material in a liquid resin solution.

19. A method according to claim 18, wherein the liquid resin solution is a polyurethane solution.

* * * * *